United States Patent Office 3,202,029
Patented Aug. 24, 1965

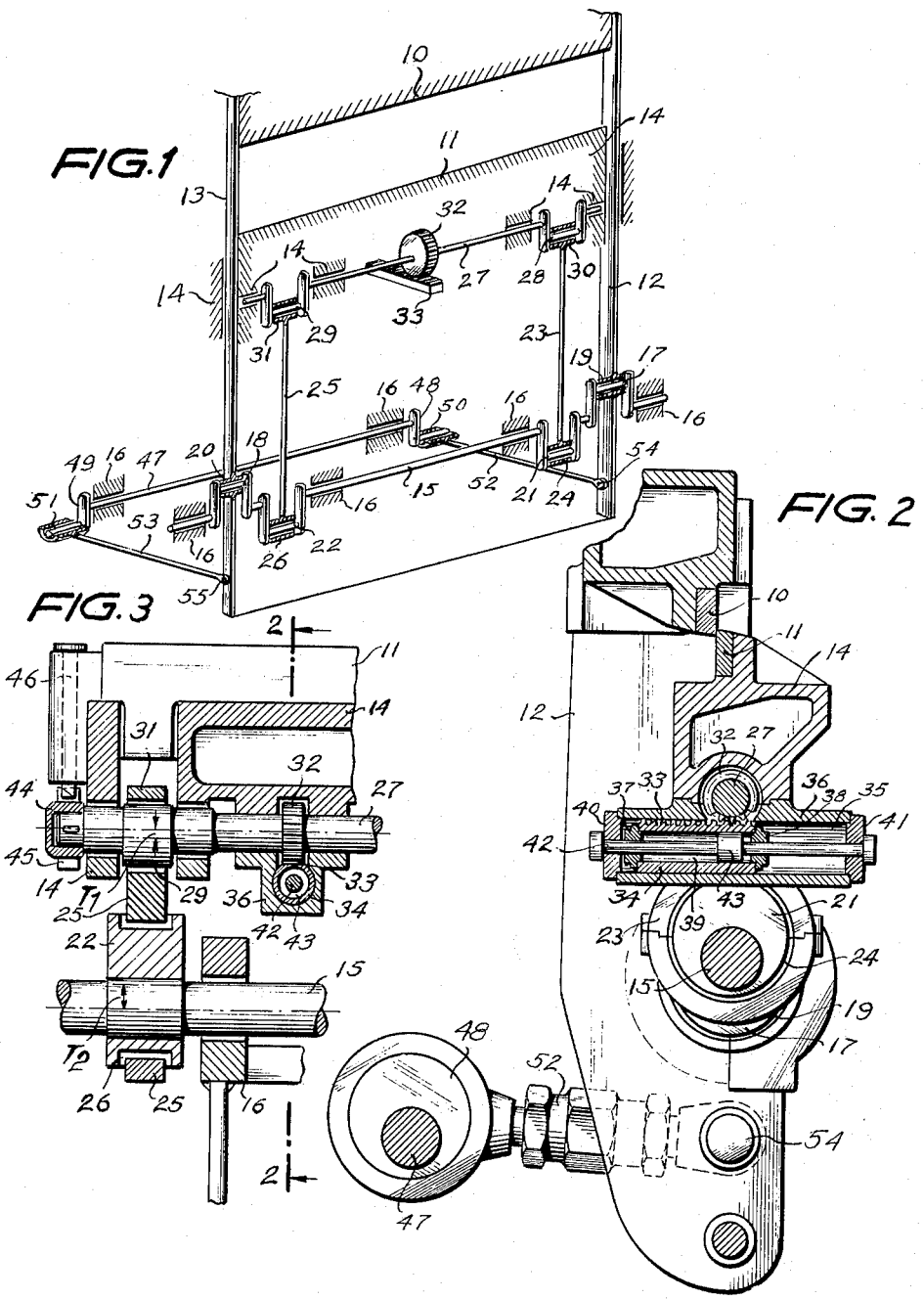

3,202,029
CONTROL MECHANISM FOR FLYING SHEARS
Günther Morath, St. Ingbert, Saar, Germany, assignor to Moeller & Neumann G.m.b.H., St. Ingbert, Saar, Germany, a German company
Filed May 22, 1961, Ser. No. 111,689
12 Claims. (Cl. 83—304)

This invention relates to metal working and more particularly to a control mechanism for flying shears which permits selective control of the cutting action to permit the shearing of sheets of material of different lengths and without interrupting the drive for the cutting blades.

In the manufacture of metal or other sheet material in the form of a continuous strip and particularly in connection with rolling mills for manufacturing such strip it has been customary to provide a cutting mechanism commonly known as a flying shear to permit cutting of the strip without interrupting the travel thereof. Where it is desired to cut the strip into uniform lengths, it has been relatively simple to provide a suitable cutting mechanism in which the operation of the cutting blades is synchronized with the speed of movement of the strip thereby performing cutting operations at periodic intervals which results in providing strips of uniform length. However, where it is desired to provide strips of varying lengths some means must be provided to control the operation of the cutting mechanism to render the cutting blades operative or inoperative at selected times in order to provide strips of the desired length.

Since the moving parts of a flying shear mechanism are relatively heavy with consequent relatively large inertia forces, it is impractical to start and stop the operation of the cutting mechanism to cut strips of different lengths and consequently, it has been attempted to solve this problem by providing means for rendering the cutting blades selectively operative or inoperative without interrupting the drive therefor, or in other words, the cutting blades are continuously driven, but some means is provided to selectively prevent the same from performing a cutting action, except at desired intervals. Previously utilized control mechanism for this purpose has been relatively complex and costly and has involved complicated mountings for the cutting blades which may be varied or adjusted to render the cutting blades operative or inoperative and also relatively complex driving mechanism for the blades has been provided in which the effective stroke of the blades is varied by adjustment of the driving mechanism. In certain instances, the adjustable drive mechanism has included continuously variable eccentric drive mechanisms which are adjusted to vary the effective throw of the eccentrics thereby resulting in providing a variable stroke for one or both of the cutting blades and usually this type of mechanism has been operated as a complete cycle in which cutting takes place during a portion of the cycle and in which the cutting action is discontinued during another portion of the cycle. Aside from the complexity of the mechanism this latter system is satisfactory where a limited number of different lengths must be cut, but where it is desired to arbitrarily adjust the mechanism for providing any desired number of cuts of a particular length or where it is desired to change the lengths of the cut at any desired time, this latter type of mechanism is not practical.

For providing an arbitrary control of the cutting action of the shearing blades, it has heretofore been proposed to mount the blades on rocking supports in which the pivot points of the rocking supports may be adjusted to render the blades operative or inoperative without interrupting the drive thereof. While this mechanism will operate satisfactorily to control the operation of the cutting blades, nevertheless, the provision of such mounting means materially increases the complexity and cost of the apparatus and furthermore, increases the number of wear points and the likelihood of more frequent breakdowns.

It is accordingly an object of this invention to provide a control mechanism for flying shears which permits convenient and arbitrary control of the cutting action of the shearing blades in order to render the same operative or inoperative and without interrupting the drive thereof.

A further object of the invention is the provision of a control mechanism for flying shears including shearing blades which reciprocate with respect one to the other and in which the relative movement thereof may be arbitrarily varied to render the cutting action of the blades operative or inoperative.

A still further object of the invention is the provision of a control mechanism for flying shears including an upper shearing blade and a lower shearing blade, together with drive means for reciprocating the blades one with respect to the other and in which the stroke of the drive means for the lower cutting blade may be varied from maximum to minimum, thereby rendering the cutting action operative or inoperative.

Another object of the invention is the provision of a control mechanism for flying shears including upper and lower shearing or cutting blades and drive mechanism for reciprocating the blades one with respect to the other, there being means provided for varying the stroke of the lower blade to provide a maximum or minimum stroke, thereby rendering the cutting action operative or inoperative and in which any torque imposed on the lower cutting blade or control mechanism is eliminated.

A further object of the invention is the provision of a control mechanism for flying shears including upper and lower shearing or cutting blades, together with drive means for reciprocating the blades one with respect to the other, there being control means for adjusting the movement of the lower blade to a maximum or minimum thereby rendering the cutting action operative or inoperative, such adjusting means including a relatively simple rack and pinion mechanism which may be operated by fluid pressure or other suitable mechanisms.

A still further object of the invention is the provision of a control mechanism for flying shears including upper and lower shearing or cutting blades, together with drive mechanism for reciprocating the blades one with respect to the other, such drive mechanism comprising a relatively simple crankshaft and connecting rod drive, together with control means for adjusting the effective throw of the drive for the lower blade to provide maximum or minimum stroke thereby rendering the cutting action operative or inoperative.

Another object of the invention is the provision of a control mechanism for flying shears, including upper and lower shearing or cutting blades, together with drive means for reciprocating the blades one with respect to the other, such drive means including a relatively simple crankshaft for reciprocating both of the blades and the control means including means for varying the throw of the crank drive for one of the blades to provide maximum or minimum movement thereof, thereby rendering the cutting action operative or inoperative.

A further object of the invention is the provision of a control mechanism for flying shears including upper and lower shearing or cutting blades, together with drive means for reciprocating such blades one with respect to the other, the drive means including a relatively simple crankshaft and connecting rods between the crankshaft and the lower blade, such connecting rods being connected to eccentrics on the lower blade and means for varying or adjusting the eccentrics to thereby provide maximum or minimum effective throw of the cranks and connecting rods to provide maximum or minimum movement of the lower blade thereby rendering the cutting action operative or inoperative and with the two adjusted positions of the eccentrics being at dead center with respect to the crankshaft thereby eliminating torque imposed on the eccentrics or lower blade by the crankshaft and connecting rods.

Further objects and advantages of the invention will be apparent from the following description taken in conjunction with the accompanying drawing wherein:

FIG. 1 is a diagrammatic view in perspective showing a porting of a flying shears together with a control mechanism therefor constructed in accordance with this invention;

FIG. 2 a vertical sectional view taken substantially on the line 2—2 of FIG. 3 and showing the details of the control mechanism of this invention; and FIG. 3 a fragmentary sectional view showing the lower blade and support, together with the drive means therefor and the adjusting or control mechanism constructed in accordance with this invention.

With continued reference to the drawing and particularly FIG. 1, there is shown diagrammatically a flying shears including an upper shearing or cutting blade 10 and a lower shearing or cutting blade 11. The upper cutting blade 10 may be carried by a frame including spaced parallel bars 12 and 13 mounted for vertical reciprocating movement and the means for reciprocating the bars 12 and 13 together with the upper blade 10 will be presently described.

The lower blade 11 is mounted on a suitable support 14 which in turn is slidably mounted on the bars 12 and 13 forming the frame for the upper blade 10 with the result that the lower blade 11 may reciprocate with respect to the upper blade 10 in a well known manner to provide a shearing action. The lower blade 11 and supporting means 14 is driven by a suitable mechanism which will be described.

A crankshaft 15 is rotatably mounted in suitable bearings 16 provided on the frame of the shearing apparatus and the crankshaft 15 may be driven in any suitable or well known manner. A pair of spaced cranks 17 and 18 are provided on the crankshaft 15 and the crank pin of the crank 17 engages a suitable bearing 19 in the bar 12 while the crank pin of the crank 18 rotatably engages a suitable bearing 20 in the bar 13. Consequently, it will be seen that rotation of the crankshaft 15 will result in reciprocating movement of the bars 12 and 13 and the upper blade 10 carried thereby. Also provided on the crankshaft 15 are a second pair of spaced cranks 21 and 22 and such cranks are angularly spaced one hundred eighty degrees with respect to the first pair of cranks 17 and 18. A connecting rod 23 is provided with a bearing 24 pivotally engaging the crank pin of the crank 21 and a second connecting rod 25 is provided with a bearing 26 pivotally engaging the crank pin of the crank 22.

A shaft 27 is rotatably mounted on the support 14 for the lower blade 11 and the shaft 27 is provided with a spaced pair of eccentrics 28 and 29. Eccentric 28 pivotally engages a bearing 30 on the connecting rod 23 and eccentric 29 pivotally engages a bearing 31 on the connecting rod 25. Fixed to the shaft 27 is a pinion gear 32 and meshing with such gear is a rack 33. Consequently, it will be seen that reciprocation of the rack 33 will serve to rotate the shaft 27 thereby varying the position of the eccentrics 28 and 29.

With particular reference to FIGS. 2 and 3, there is shown one form of mechanism for operating the rack 33 to rotate the eccentric shaft 27 and this form of the mechanism may well comprise a hollow elongated cylindrical member 34 in which the rack 33 is formed and the member 34 is slidably mounted in the bore 35 of a bracket 36 mounted on the support 14 for the lower blade 11. The cylindrical member 34 is closed at opposite ends by suitable head members 37 and 38 to provide a cylinder 39 and the bracket 36 may be provided with end members 40 and 41. Fixed to the end members 40 and 41 is a rod 42 which extends through apertures in the head members 37 and 38 of the cylindrical member 34 and through the cylinder 39. Fixed on the rod 42 within the cylinder 39 and engaging the wall thereof is a piston 43. Suitable means, not shown, may be provided for selectively introducing fluid pressure into the cylinder 39 at opposite sides of the piston 43 and as shown in FIG. 2, if fluid pressure is introduced into the cylinder 39 to the right of the piston 43, this will result in movement of the cylindrical member 34 and rack 33 toward the right thereby rotating the pinion 32 and shaft 27 fixed thereto to change the position of the eccentrics 28 and 29. In a similar manner, if fluid pressure is introduced into the cylinder 39 to the left of the piston 43, the cylindrical member 34 and rack 33 will move toward the left to rotate the shaft 27 and vary the position of the eccentrics 28 and 29.

Since it is only desired to move the eccentrics 28 and 29 through one hundred eighty degrees between upper and lower dead center positions, the accurate location of such eccentrics in such positions may be insured by the provision of a cap 44 fixed to one end of the shaft 27 and provided on the cap 44 are ears 45 spaced one hundred eighty degrees apart and which serve to engage an abutment in the form of a pin 46 carried by the support 14 for the lower blade 11 and projecting in the path of movement of the ear 45. Obviously, other means for limiting movement of the eccentrics 28 and 29 between upper and lower dead center positions may be provided if desired. Also, of course, other suitable means for rotating the shaft 27 to vary the position of the eccentrics 28 and 29 may be utilized and the particular mechanism shown and described is for illustrative purposes only, but does, of course, provide one practical mechanism for accomplishing this result.

The bars 12 and 13, together with the upper blade 10 carried thereby, as well as the lower support 14 and lower blade 11 carried thereby may be oscillated to provide a flying shear action in the well known manner, by means of a rock shaft 47 rotatably mounted in the frame 16 of the apparatus and the rock shaft 47 may be provided with spaced cranks 48 and 49 which pivotally engage bearings 50 and 51 provided on connecting rods 52 and 53. The opposite ends of connecting rods 52 and 53 may be pivotally connected at 54 and 55 respectively to the bars 12 and 13 and the rock shaft 47 may be oscillated in any suitable manner to in turn oscillate the bars 12 and 13 together with the support 14 and upper and lower cutting blades 10 and 11.

As shown in FIG. 3, the throw of the eccentrics 28 and 29 is indicated as $T_1$ and the throw of cranks 21 and 22 is indicated as $T_2$ and the operation of the apparatus of this invention will now be described with particular reference to FIG. 1.

With the crankshaft 15 rotating and with the eccentrics 28 and 29 in the position shown in FIG. 1, support 14 and lower blade 11 with respect to the crankshaft 15 will be twice the radius $r_2$ of the cranks 21 and 22 and this movement, together with the movement of the upper blade 10 provided by the cranks 17 and 18 will result in providing a shearing or cutting action on strip material passing between the blades 10 and 11. Such cutting action will periodically continue so long as the eccentrics 28 and 29 remain in the position shown in FIG. 1. When it is desired to render the cutting action inoperative, the rack 33 is actuated to rotate the shaft 27 and move the eccentrics 28 and 29 to a position angularly spaced one hundred eighty degrees from that shown in FIG. 1, at which time the movement of the support 14 and lower blade 11 with respect to the upper blade 10 or with respect to the crankshaft 15 will be reduced by an amount equal to twice the radius $r_1$ of the eccentrics 28 and 29.

This reduction in movement of the support 14 and lower blade 11 is sufficient to prevent cooperation between the upper and lower blades 11 to accomplish a cutting action and consequently, even though the blades continue to reciprocate one with respect to the other, there will be no cutting of the strip passing therebetween. When it is desired to make a cut, it is, of course, only necessary to return the eccentrics 28 and 29 to the position shown in FIG. 1 by suitable operation of the rack 33.

It will further be seen that as shown in FIG. 1, the eccentrics 28 and 29 are positioned in a lower dead center position with respect to the crankshaft 15 and, therefore, in this position, no torque will be exerted on the shaft 27 by the operation of the cranks 21 and 22 and the connecting rods 23 and 25 and by the same token with the eccentrics 28 and 29 in the opposite or upper dead center position spaced one hundred eighty degrees from the position shown in FIG. 1, there will likewise be no torque exerted on the shaft 27 by the operation of the cranks 21 and 22 and connecting rods 23 and 25. By reason of this structure, the pinion gear 32 and rack 33 together with associated mechanism need only be of minimum weight construction, since the only forces transmitted thereby are for the purpose of rotating the shaft 27 to change the position of the eccentrics 28 and 29 and this mechanism need withstand none of the forces exerted during the shearing operation.

It will be seen that by the above described invention there has been provided a relatively simple, yet highly effective control mechanism for flying shears in which such shears may be rendered operative or inoperative without interrupting the drive for the cutting blades and furthermore, the control mechanism may be of relatively light-weight constructions, since none of the shearing forces are carried thereby with the result that the construction of the device is relatively economical and furthermore, the likelihood of breakdown is maintained at a minimum.

While the control mechanism has been shown and described as comprising a shaft mounted on the support for the lower blade and carrying eccentrics thereon, obviously if desired, this structure could be replaced by eccentric bearings on the cranks utilized to reciprocate the lower blade and in which suitable means would be provided for adjusting such eccentrics to vary the throw of the cranks between limits desired to render the cutting action operative or inoperative. However, this latter construction would be more costly and complex and consequently, the structure specifically described above is to be preferred.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A control mechanism for flying shears including a frame mounted for vertical reciprocating movement and for oscillation about a horizontal axis, an upper cutting blade carried by said frame, a lower cutting blade support slidably mounted on said frame for movement toward and away from said upper blade and a lower cutting blade mounted on said support for cooperation with said upper blade to shear a strip of material disposed between said blades, said control mechanism comprising a crankshaft having a first pair of cranks rotatably connected to said frame for reciprocating the same and a second pair of cranks angularly spaced one hundred eighty degrees from said first cranks, a shaft rotatably mounted on said support, a pair of eccentrics on said shaft, connecting rods connecting said eccentrics and said second cranks and means mounted solely on said support to rotate said shaft from one position to a second position angularly spaced one hundred eighty degrees from said first position, whereby with said shaft in said first postion rotation of said crankshaft will move said blades into shearing relationship and upon rotation of said shaft to said second position and rotation of said crankshaft said lower blade will reciprocate in spaced inoperative relationship to said upper blade.

2. A control mechanism for flying shears as defined in claim 1 in which said first and second positions of said eccentrics are at dead center with respect to said crankshaft to prevent the application of torque to said shaft by said connecting rods.

3. A control mechanism for flying shears as defined in claim 1 in which the means for rotating said shaft comprises a pinion gear fixed to said shaft, a rack slidably mounted on said support and meshing with said pinion, an axial bore in said rack providing a cylinder, a fixed rod extending through said bore, a piston fixed to said rod within said cylinder, means closing the opposite ends of said cylinder about said rod, means to selectively supply fluid pressure to said cylinder at opposite sides of said piston to reciprocate said rack and rotate said shaft and stop means on said shaft and support to limit angular movement of said shaft to one-hundred eighty degrees in either direction.

4. A control mechanism for flying shears as defined in claim 1 in which the means for rotating said shaft comprises a pinion gear fixed to said shaft, a rack slidably mounted on said support and meshing with said pinion, an axial bore in said rack providing a cylinder, a fixed rod extending through said bore, a piston fixed to said rod within said cylinder, means closing the opposite ends of said cylinder about said rod and means to selectively supply fluid pressure to said cylinder at opposite sides of said piston to reciprocate said rack and rotate said shaft.

5. A control mechanism for flying shears as defined in claim 1 in which the means for rotating said shaft comprises a pinion gear fixed to said shaft, a rack slidably mounted on said support and meshing with said pinion, an axial bore in said rack providing a cylinder, a piston fixed within said cylinder and means to selectively supply fluid pressure to said cylinder at opposite sides of said pistons to reciprocate said rack and rotate said shaft.

6. A control mechanism for flying shears as defined in claim 1 in which the means for rotating said shaft comprises a pinion gear fixed to said shaft, a rack slidably mounted on said support and meshing with said pinion and fluid pressure means to reciprocate said rack in either direction and rotate said shaft.

7. A control mechanism for flying shears as defined in claim 1 in which the means for rotating said shaft comprises a pinion gear fixed to said shaft, a rack slidably mounted on said support and meshing with said pinion and means to reciprocate said rack in either direction to rotate said shaft.

8. A control mechanism for flying shears including a frame mounted for vertical reciprocating movement and for oscillation about a horizontal axis, an upper cutting blade carried by said frame, a lower cutting blade support slidably mounted on said frame for movement toward and away from said upper blade and a lower cutting blade mounted on said support for cooperation with said upper blade to shear a strip of material disposed between said blades, said control mechanism comprising a crankshaft having a first pair of cranks rotatably connected to said frame for reciprocating the same and a second pair of cranks angularly spaced one hundred eighty degrees from said first cranks, a shaft rotatably mounted on said support, a pair of eccentrics on said shaft, connecting rods connecting said eccentrics and said second cranks and means mounted solely on said support to rotate said shaft from one position to a second position, whereby with said shaft in said first position rotation of said crankshaft will move said blades into shearing relationship and upon rotation of said shaft to said second position and rotation of said crankshaft said lower blade will reciprocate in spaced inoperative relationship to said upper blade.

9. A control mechanism for flying shears including a frame mounted for vertical reciprocating movement and for oscillation about a horizontal axis, an upper cutting blade carried by said frame, a lower cutting blade support slidably mounted on said frame for movement toward and away from said upper blade and a lower cutting blade mounted on said support for cooperation with said upper blade to shear a strip of material disposed between said blades, said control mechanism comprising a crankshaft having a first pair of cranks rotatably connected to said frame for reciprocating the same and a second pair of cranks angularly spaced one hundred and eighty degrees from said first crank, a pair of eccentrics on said support, connecting rods connecting said eccentrics and said second cranks and means mounted solely on said support to rotate said eccentrics from one position to a second position, whereby with said eccentrics in said first position rotation of said crankshaft will move said blade into shearing relationship and upon rotation of said eccentrics to said second position and rotation of said crankshaft said lower blade will reciprocate in spaced inoperative relationship to said upper blade.

10. A control mechanism for flying shears including a frame mounted for vertical reciprocating movement and for oscillation about a horizontal axis, an upper cutting blade carried by said frame, a lower cutting blade support slidably mounted on said frame for movement toward and away from said upper blade and a lower cutting blade mounted on said support for cooperation with said upper blade to shear a strip of material disposed between said blades, said control mechanism comprising a crankshaft rotatably connected to said frame for reciprocating the same and a second crank angularly spaced one hundred eighty degrees from said first crank, an eccentric on said support, a connecting rod connecting said eccentric and said second crank and means mounted solely on said support to rotate said eccentric from one position to a second position, whereby with said eccentric in said first position rotation of said crank shaft will move said blades into shearing relationship and upon rotation of said eccentric to said second position and rotation of said crankshaft said lower blade will reciprocate in spaced inoperative relationship to said upper blade.

11. A control mechanism for flying shears including a frame mounted for vertical reciprocating movement and for oscillation about a horizontal axis, an upper cutting blade carried by said frame, a lower cutting blade support slidably mounted on said frame for movement toward and away from said upper blade and a lower cutting blade mounted on said support for cooperation with said upper blade to shear a strip of material disposed between said blades, said control mechanism comprising a crankshaft having a crank rotatably connected to said frame for reciprocating the same and a second crank angularly spaced one hundred and eighty degrees from said first crank, a pivot point on said support, a connecting rod connecting said pivot point and said second crank and means to move said pivot point from one position to a second position, whereby with said pivot point in said first position rotation of said crankshaft will move said blades into shearing relationship and upon movement of said pivot point to said second position and rotation of said crankshaft said lower blade will reciprocate in spaced inoperative relationship to said upper blade.

12. A control mechanism for flying shears including a frame member mounted for vertical reciprocating movement and for oscillation about a horizontal axis, an upper cutting blade carried by said frame member, a lower cutting blade support member slideably mounted on said frame member for movement toward and away from said upper blade and a lower cutting blade mounted on said support member for cooperation with said upper blade to shear a strip of material disposed between said blades, said control mechanism comprising a crankshaft having a crank rotatably connected to said frame member for reciprocating the same and a second crank angularly spaced one hundred and eighty degrees from said first crank, a connecting means connecting said second crank and said support member, and means for longitudinally displacing said connecting means from a first predetermined position to a second predetermined position to vary the effective throw of said second crank independently of the drive of said crankshaft and to alter the movement of said support to cause said lower blade to reciprocate in spaced inoperative relationship to said upper blade, said displacing means being located on one of said members.

References Cited by the Examiner

UNITED STATES PATENTS

| | | | |
|---|---|---|---|
| 2,261,007 | 10/41 | Talbot | 83—315 |
| 2,349,874 | 5/44 | Littell | 83—528 |
| 2,632,509 | 3/53 | Skillman | 83—315 |
| 2,800,179 | 7/57 | Munchbach | 83—316 |

ANDREW R. JUHASZ, *Primary Examiner.*

CARL W. TOMLIN, *Examiner.*